(12) United States Patent
Peikari

(10) Patent No.: US 6,931,570 B2
(45) Date of Patent: Aug. 16, 2005

(54) SELF-OPTIMIZING THE DIAGNOSIS OF DATA PROCESSING SYSTEMS BY FLEXIBLE MULTITASKING

(75) Inventor: Cyrus Peikari, 6242 Walnut Hill Ln, Dallas, TX (US) 75230

(73) Assignee: Cyrus Peikari, Dallas, TX (US)

( * ) Notice: Subject to any disclaimer, the term of this patent is extended or adjusted under 35 U.S.C. 154(b) by 965 days.

(21) Appl. No.: 09/847,571

(22) Filed: May 2, 2001

(65) Prior Publication Data

US 2002/0166085 A1 Nov. 7, 2002

(51) Int. Cl.[7] .................................. G06F 11/00
(52) U.S. Cl. ........................ 714/25; 713/200
(58) Field of Search ................ 714/25, 33, 200; 713/200

(56) References Cited

U.S. PATENT DOCUMENTS

| | | | | |
|---|---|---|---|---|
| 5,303,369 | A | * | 4/1994 | Borcherding et al. ....... 718/104 |
| 5,327,550 | A | * | 7/1994 | Pribnow ..................... 714/39 |
| 6,567,837 | B1 | * | 5/2003 | Robinson ..................... 718/1 |
| 6,757,830 | B1 | * | 6/2004 | Tarbotton et al. ........... 713/188 |
| 2002/0083113 | A1 | * | 6/2002 | Natu ........................ 709/100 |
| 2002/0120725 | A1 | * | 8/2002 | DaCosta et al. ............ 709/221 |
| 2002/0138226 | A1 | * | 9/2002 | Doane ....................... 702/119 |
| 2003/0115509 | A1 | * | 6/2003 | Dubal ........................ 714/46 |

OTHER PUBLICATIONS

Symantec "Configuring Norton Systemworks to use fewer system resources" 2004 www.symantec.com*

* cited by examiner

*Primary Examiner*—Bryce P Bonzo

(57) ABSTRACT

The present invention provides a method and apparatus for increasing the efficiency at which computer viruses and corrupted files are detected on computer operating systems that support multitasking. The flexibility of the system allows data processing systems to reduce scanning time by utilizing multitasking to perform virus scans in parallel, subject to the amount of available memory and the number of simultaneous tasks that are available to be used by the parallel processes. This is achieved by (1) detecting the maximum number of simultaneous tasks which the operating system can allocate to the scanning operation, (2) detecting the maximum amount of free memory which can be made available to the scanning operation, (3) calculating the maximum number of processes (tasks) that can be supported by the currently available free memory, (4) launching multiple, simultaneous processes to scan for computer virus signatures, (5) detecting the subsequent amount of system memory and the number of simultaneous tasks available, (6) providing negative or positive feedback depending on the amount of system memory and the number of simultaneous tasks currently available, (7) modifying the number of active tasks based on this feedback, and (8) repeating and maintaining this feedback process in real-time.

5 Claims, 5 Drawing Sheets

SELF-OPTIMIZING THE DIAGNOSIS OF DATA PROCESSING SYSTEMS BY FLEXIBLE MULTITASKING

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The invention relates to the diagnosis of data processing systems. In particular, the invention is directed to increasing the efficiency at which viruses and corrupted files are detected in computer systems, especially those that support multitasking.

BACKGROUND OF THE INVENTION

The most common method for detecting computer problems such as viruses or corrupted files is by "scanning". This method involves searching files in a computer system for data signatures that are unique to the target. For example, a virus may be identified by a particular string of data. A typical virus scanner operates by loading a set of virus data signatures into memory and then sequentially scanning the host system files for the presence of these data signatures.

If a scan reveals the presence of a virus or corrupted files, any number of protocols may follow, usually beginning with the deletion of the unwelcome data. As with most aspects of data processing systems, the speed and accuracy at which such diagnostics are performed is critical, since it may take only milliseconds for a virus to cause damage of staggering proportions.

However, the number of computer viruses is continually growing. There are currently over 50,000 known computer viruses. As a result, the process of virus scanning is becoming more time consuming. For example, scanning a system with 20,000 files for a data set of 50,000 virus signatures would involve a total of one billion searches. Thus, the need to improve the efficiency of virus detection is greater than ever.

Currently, virus scanning is done in a linear fashion. In other words, scanning is performed as a single, step-wise process. This is because, until now, most viruses have infected computers with operating systems that do not support multitasking. For example, the Linux® operating system, which supports multitasking, has been more than 99% resistant to viruses because of its strong file system security.

However, new viruses have emerged that can now infect multitasking operating systems such as Linux®. In addition, the number of multitasking operating systems on the market is growing, most of which are susceptible to the new strains of computer viruses. For example, Windows CE® is a popular operating system that supports multitasking. Windows CE® is designed to run efficiently on mobile devices such as handheld personal data assistants, pocket computers and wireless phones. Currently, Windows CE® can support 32 simultaneous tasks.

Similarly, Windows 2000® is a new operating system that can support multitasking by utilizing and supporting multiple central processing units (CPUs). For example, Windows 2000® Datacenter Server is an operating system that can currently support up to 32 simultaneous processes on 32 separate CPUs.

As explained above, prior art diagnostic systems are limited to scanning in a linear fashion. Currently, the prior art has no provision for automatically and dynamically optimizing the efficiency of scanning based on the resources available to a data processing system (such as multitasking or available memory). As a result, the linear approach has two serious disadvantages.

First, when these prior art linear diagnostic routines are performed, one or more other operations are usually halted. This causes a substantial loss of productivity, especially when linear scanning operations fail to take advantage of all of the memory that may be available. In other words, system resources (such as memory) may be underutilized or even idle while the scanning is underway. This is especially troubling when other operations must halt and wait to use those resources that are already idle.

Second, linear scanning does not take advantage of multitasking operating systems in order to improve efficiency of scanning by creating multiple processes that run in parallel.

SUMMARY OF THE INVENTION

The present invention overcomes the disadvantages of the prior art, by offering the following:

1. A method and apparatus for self-optimizing by monitoring available system memory in real time and by automatically and flexibly controlling the number of simultaneous scanning processes. This improves the efficiency of the scanning process by maximizing the use of available resources.

2. A method and apparatus for improving the speed of scanning by running multiple processes in parallel in order to take advantage of multitasking operating systems.

The present invention provides a system for increasing the efficiency at which computer viruses and corrupted files are detected by taking full advantage of available memory and multitasking operating systems.

In a preferred embodiment, the present invention contemplates a method and apparatus for increasing the efficiency at which computer viruses and corrupted files are detected on computer systems that support multitasking. The flexibility of the invention allows data processing systems to reduce scanning time by utilizing multitasking to perform virus scans in parallel, subject to the amount of available memory and the number of simultaneous tasks that are available to be used by the parallel processes.

This is achieved by: (1) detecting the maximum number of simultaneous tasks which the operating system can allocate to the scanning operation, (2) detecting the maximum amount of free memory which can be made available to the scanning operation, (3) calculating the maximum number of processes (tasks) that can be supported by the currently available free memory, (4) launching multiple, simultaneous processes to scan for computer virus signatures, (5) detecting the subsequent amount of system memory and the number of simultaneous tasks available, (6) providing negative or positive feedback depending on the amount of system memory and the number of simultaneous tasks currently available, (7) modifying the number of active tasks based on this feedback, and (8) maintaining this feedback process in real-time.

BRIEF DESCRIPTION OF THE DRAWINGS

The present invention may be understood more clearly from the following detailed description, which is solely for explanation and should not be taken to limit the invention to any specific form thereof, taken together with the accompanying drawings, wherein.

DETAILED DESCRIPTION

Figure 1:
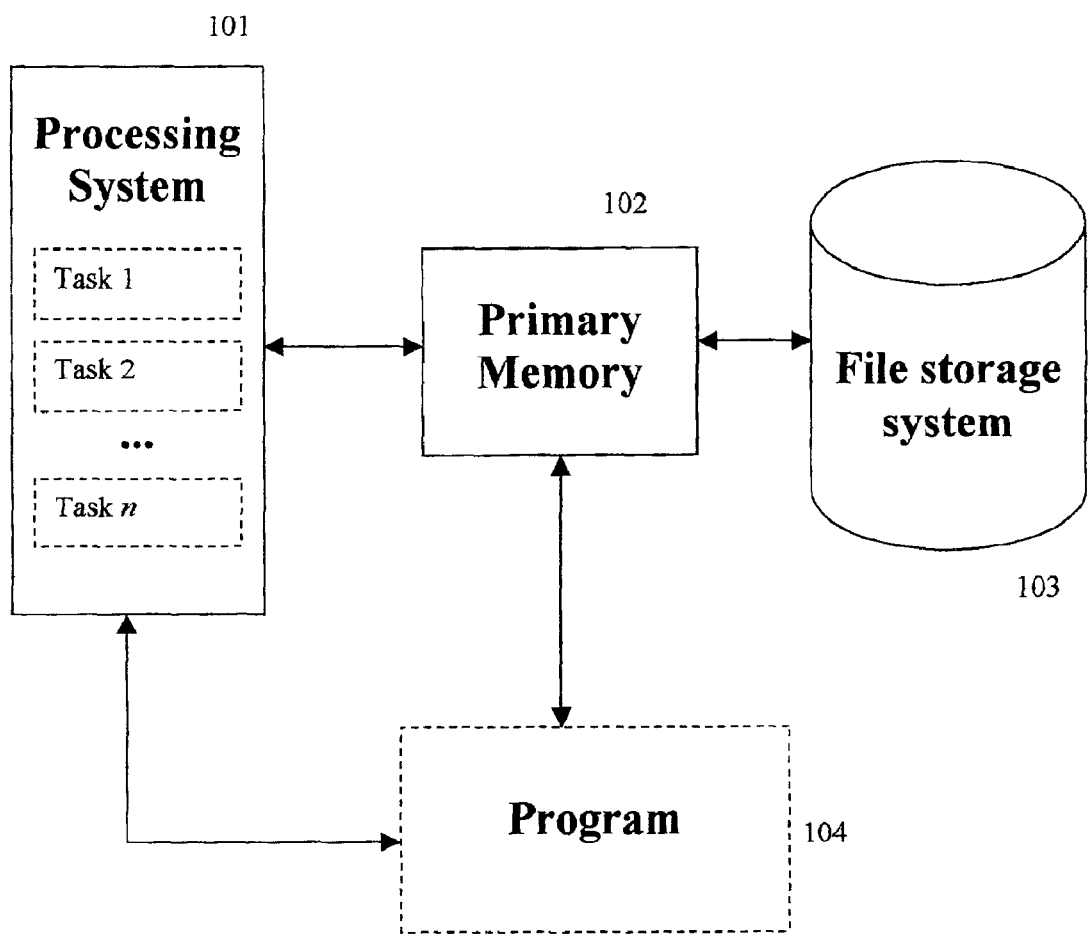
FIG. 1 is a block diagram of a computer system employing the diagnostic capabilities of the present invention.

The operation of the present invention will now be described in conjunction with the Drawing Figures.

FIG. 1 illustrates a multitasking computer system that is configured to utilize the present invention. The processing unit 101 may include a single central processing unit, or multiple CPUs, as long as the configuration can support multitasking. The processing unit 101 is connected to main memory 102, which is in turn connected to the file storage system 103, which may be one or more hard disks, tape drive(s) or other nonvolatile storage. Although not shown, the processing unit 101 may also be directly connected to the file storage system 103. Alternatively, one or more distinct memory controllers may be used to manage the operation and scanning of the various memories.

As shown in FIG. 1, a program (or group of programs) 104 may require data transfers back and forth between the processing unit 101 and the memory 102. Although not shown, the program 104 may require data transfers back and forth between the processing unit 101 and the file storage 103 as well.

In any case, the processing unit 101 (or any separate memory controllers) will be configured to run the multiple tasks required of the program 104 in parallel, within the limits of the memory available in units 102 or 103 and within the limits of the operating system of the computer.

Figure 2:
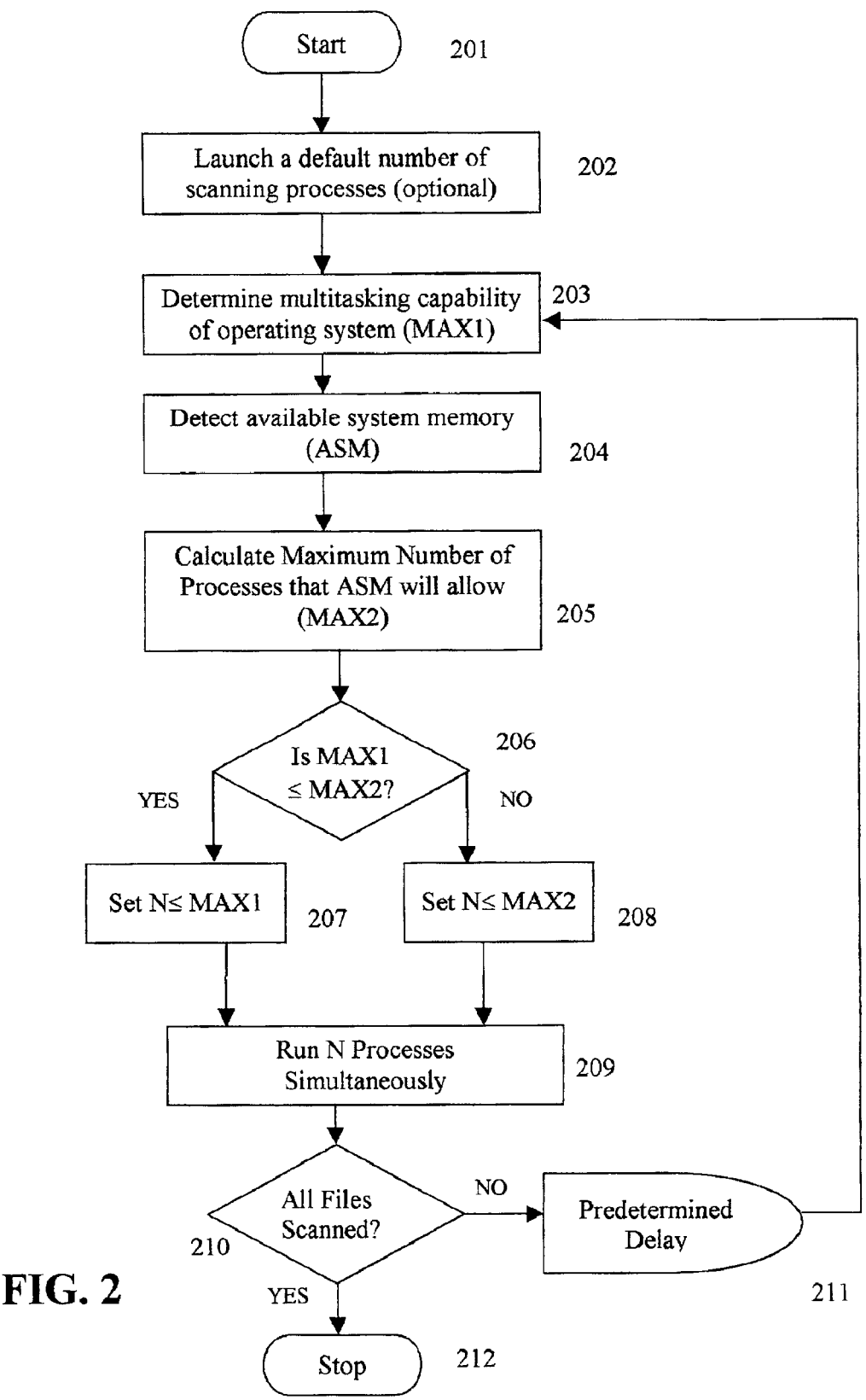
FIG. 2 is a flow diagram illustrating a first embodiment of the present invention, which performs a diagnosis based on the current limits of the operating system and of the available memory.

FIG. 2 illustrates how the present invention determines the maximum scanning capabilities of the system described in FIG. 1 and how such determination is used to set in motion a fully optimized, yet dynamically scalable number of diagnostic processes.

After the diagnosis starts at step 201, the system may optionally launch a default number of scanning processes 202. If this option is used, then scanning can begin immediately. Although the default scanning will not necessarily be optimized, another option is to set the default number equal to the last known number of simultaneous scanning processes used during the most recent previous virus scan.

In any case, the default number of scanning processes will be underway while the processing unit or controller waits to receive and calculate the data needed to optimize the scanning operation. Thus, even if the default number of scanning processes is set at a conservative number such as one (a serial scan), having one process running during the optimization is better than none at all.

At step 203, the optimization begins with a determination of the multitasking support capability of the operating system. This capability will depend on two factors. Namely, (1) the maximum number of processes that the operating system is designed to support and (2) the number of other processes that are currently running. Thus, the number of processes that can be made available to a diagnostic routine will be roughly equal to (or less than) the maximum number allowed by the operating system minus the number of other processes running.

When the system determines the maximum number of simultaneous scanning processes that the operating system can make available to the diagnostic scanning operation, this number will be referred to as "MAX1".

A second stage of optimization occurs when the system detects the current amount of available system memory in step 204. This detection can be achieved by performing calls to the operating system. In the Windows® operating systems, for example, this detection can be performed with the built-in GlobalMemoryStatus function to determine how much memory the application can allocate without severely impacting other applications. Once the appropriate amount available system memory has been determined, that amount will be referred to as "ASM." In step 205, the ASM is used to calculate the maximum number of processes allowed. This number will be referred to as "MAX2".

In step 206, a decision is made in order to determine the optimal number "N" of simultaneous processes that may be run. This decision is based on MAX1 (the available multitasking capability of the operating system) and on MAX2 (the available memory capability of the computer system). If MAX1 is less than or equal to MAX2, then N is set to equal MAX1 in step 207. However, If MAX1 is not less than or equal to MAX2, then N is set to equal MAX2 in step 208. As a result, the number N of simultaneous processes will always be equal to the lesser of MAX1 and MAX2. Optionally, the number N may be set lower than the lesser of MAX1 and MAX2 (which may be useful in certain circumstances, such as systems which have a high level of fluctuation in the amount of processes running and/or memory usage). In any case, the optimal number of simultaneous processes that may be run will always be limited by both the operating system and by the amount of available memory.

In step 209, the optimized scanning begins. At this step, the system either launches or terminates scanning processes to keep the total number of simultaneous processes equal in number to N.

In step 210, a check is performed to see if all appropriate memory areas have been scanned for viruses or corrupted files. If the scanning routine is not complete, then the individual scanning processes will continue. The system may optionally wait for a predetermined period of time, note step 211, before re-optimizing. Such an option can be useful when it is not necessary to expend system resources to repeat the optimization routine immediately. After the optional delay at step 211, the system returns to the optimization at step 203. Steps 203 and 204 are repeated since most systems experience a dynamic fluctuation in the amount of available memory and the amount of system processes which may be dedicated to virus scanning without impacting other system operations.

Optionally, another check (not shown) to determine whether all files have been scanned may be performed between step 211 and step 203. This is useful to prevent another re-optimization if the decision made at step 210 occurred just before all of the files were scanned.

In this manner, the system flexibly and repeatedly optimizes and re-optimizes the number of scanning processes that are being run, according to the current limitations of the host computer. When step 210 determines that that all the files have been scanned, the scanning routine terminates at step 212.

Figure 3:
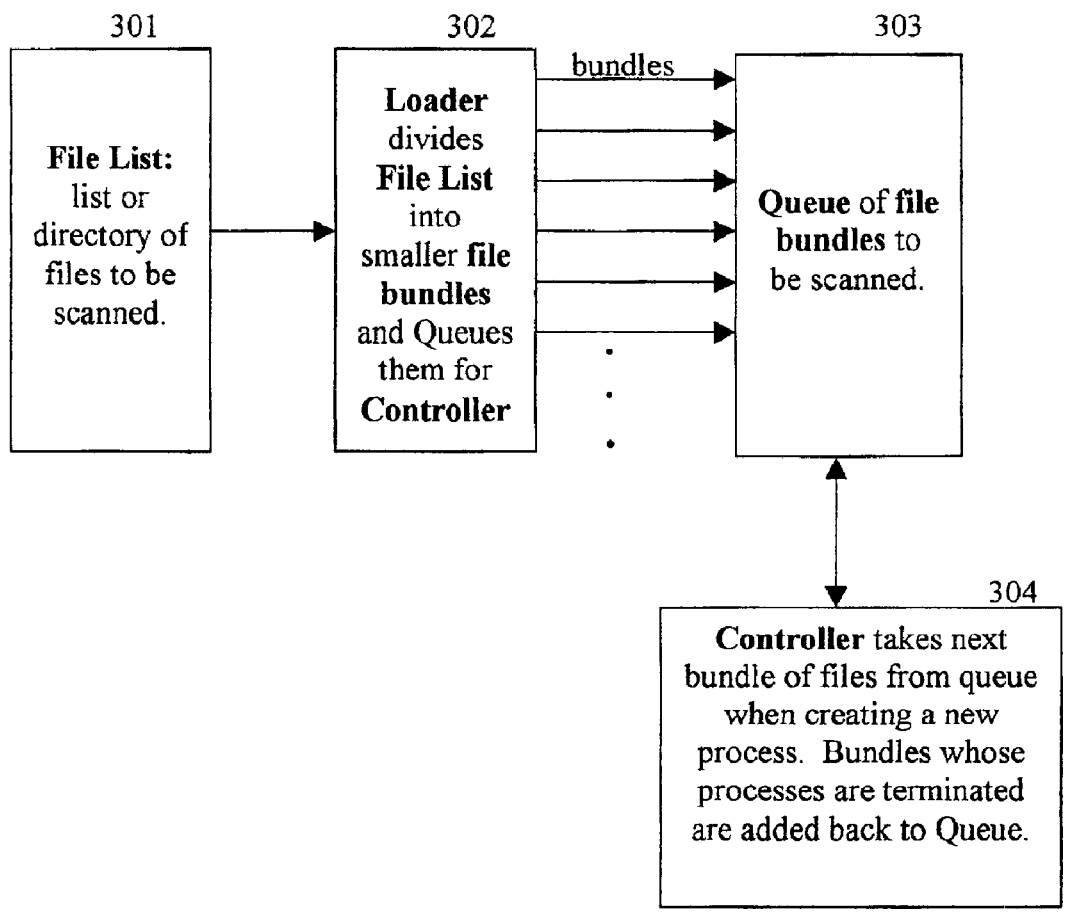
FIG. 3 is a flow diagram illustrating how the processes of FIG. 2 are bundled.

FIG. 3 illustrates an example of how files may be grouped and prepared for scanning. The complete group of files on the computer system to be scanned 301 is referred to as the "File List." A Loader 302 takes the file list 301 and divides it into smaller bundles 302. These smaller bundles of files are loaded into a Queue 303 to be scanned. As each new scanning process is created, a Controller 304 removes the next file bundle from the Queue 303 and presents it to be scanned by the new process. Conversely, if a process is terminated, the file bundle is added back to the Queue 303. The Controller 304 may be implemented in the processing unit 101 or optionally in one or more separate memory control units, as discussed above.

Figure 4:
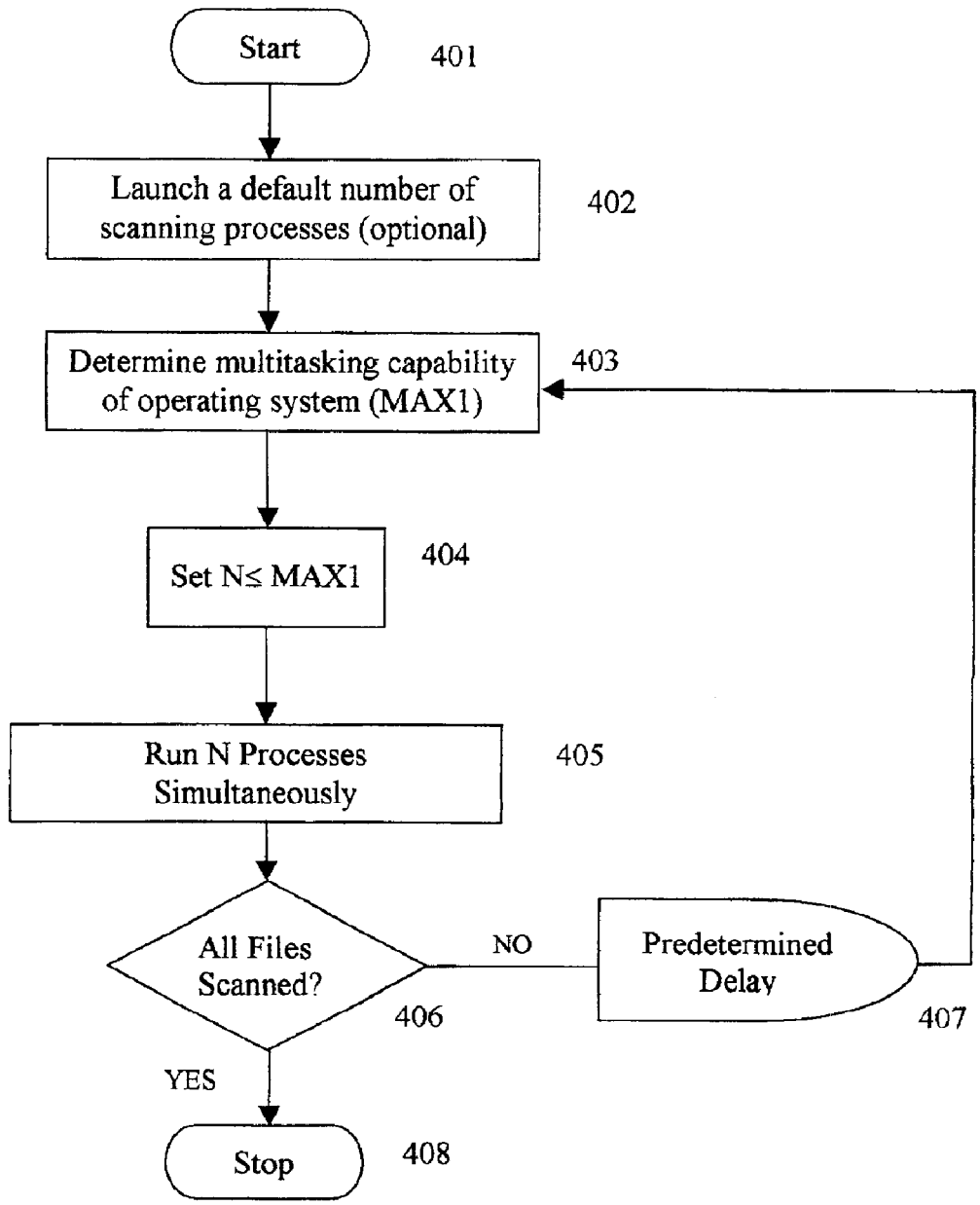
FIG. 4 is a flow diagram illustrating a second embodiment of the present invention, which performs a diagnosis based on the limits of the operating system.

FIG. 4 describes a second embodiment of the present invention. In this embodiment, the optimization scheme is subject only to the multitasking limits of the operating system. This is particularly useful in systems where the amount of available memory is great enough to allow for more scanning processes than an associated operating system will ever be able to support. After starting at step 401, a default number of scanning processes may optionally be launched in step 402. The benefits of such an option are discussed above. In any case, when step 403 is reached, the system determines the maximum available multitasking capability of the operating system, MAX1, utilizing (1) the maximum number of processes that the operating system is designed to support and (2) the number of other processes that are currently running, in the manner described above. In step 404, the optimal number "N" of simultaneous processes that may be run is automatically set to be equal to or less than MAX1.

At step 405, the optimized scanning routine begins. N processes are run simultaneously. If step 406 determines that not all of the files have been scanned, an optional delay might be inserted at step 407, the benefits of which are discussed above. Optionally, another check (not shown) to determine whether all files have been scanned may be performed between step 407 and step 403, the benefits of which are discussed above.

In any case, the system will eventually return to step 403 if it has been determined that not all of the files have been scanned. At this point, the scanning routine is re-optimized based on the most current information regarding the amount of simultaneous processes that may be made available. Step 405 will then launch or terminate diagnostic processes to match the new value of "N".

Only after all of the appropriate files have been scanned, is the scanning routine allowed to terminate in step 408. The details of the operation of the scanning mechanism are as described above for FIG. 3. This second embodiment of the invention may also be implemented as an option in the embodiment of FIG. 2, by bypassing the requirement to detect the ASM and calculate MAX2 and instead setting MAX2 to a very high default value.

Figure 5:
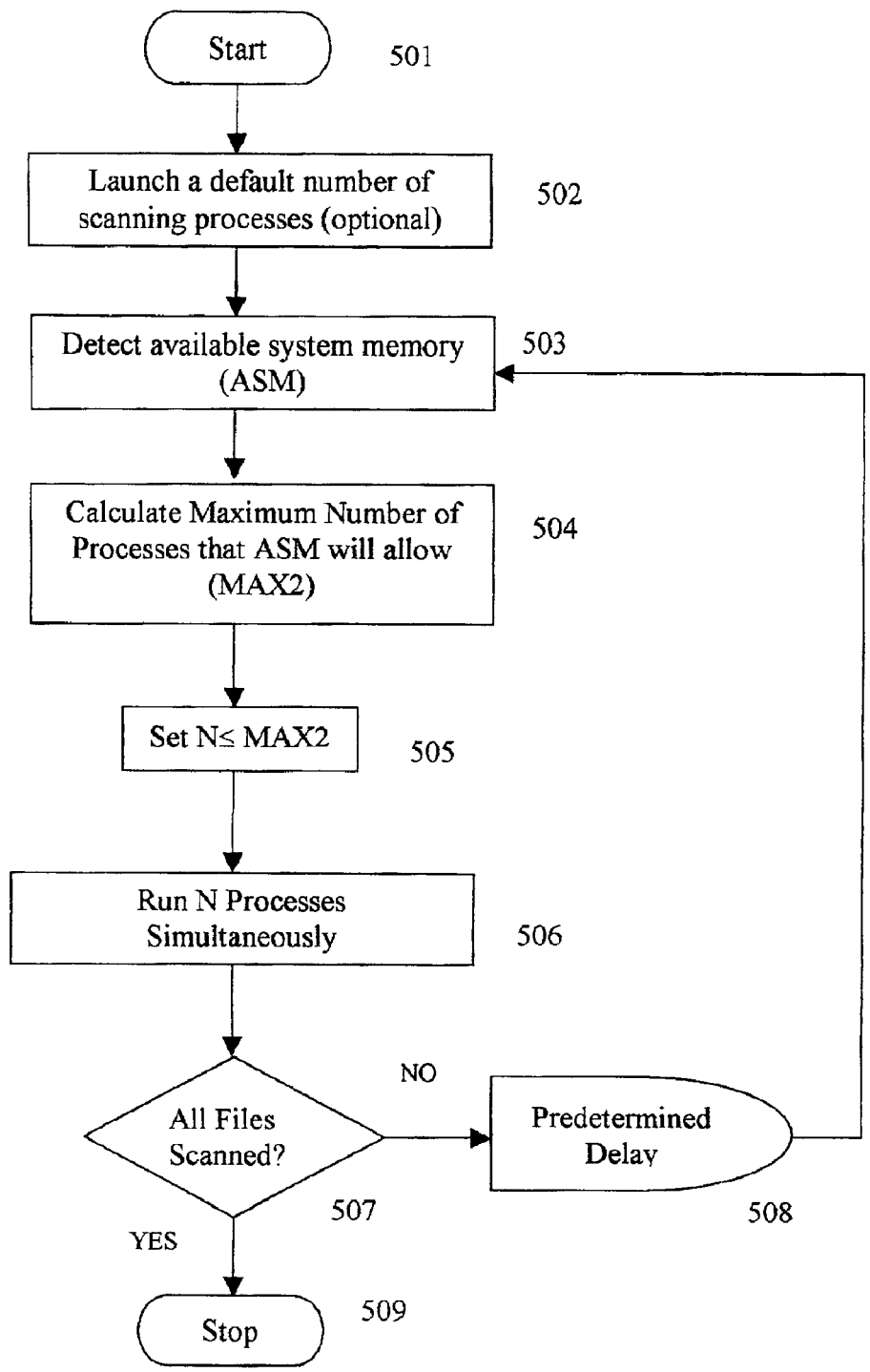
FIG. 5 is a flow diagram illustrating a third embodiment of the present invention, which performs a diagnosis based on the limits of the available memory.

FIG. 5 illustrates a third embodiment of the present invention. In this embodiment, the optimization scheme is subject only to the limits of the amount of available system memory. This is particularly useful in systems where the multitasking limits of the operating system are great enough to allow for more scanning processes than available system memory will ever be able to support.

Upon starting at step 501, a default number of scanning processes may optionally be launched in step 502. The benefits of such an option are discussed above. In any case, when step 503 is reached, the system detects the amount of available system memory, ASM. In step 504, the system uses the ASM to calculate the maximum number (MAX2) of simultaneous scanning processes which the ASM will allow. In step 505, the optimal number N of simultaneous processes that may be run is automatically set to be equal to or less than MAX2.

At step 506, the optimized scanning processes begin. In step 507, a check is performed to determine if all appropriate memory areas have been scanned for viruses or corrupted files. If the scanning routine is not complete, then the individual scanning processes will continue. The system may optionally wait for a predetermined period of time, as in step 508, before re-optimizing. The benefits of such an option are discussed above. After the optional delay at step 508, the system starts to re-optimize by returning to step 503. This routine repeats until it has been determined at step 507 that all appropriate files have been scanned. When all of the scanning is complete, the program will terminate at step 509.

Optionally, another check (not shown) to determine whether all files have been scanned may be performed between step 508 and step 503, for the reasons discussed above. The details of the operation of the scanning mechanism are as described above for FIG. 3.

This third embodiment of the invention may also be implemented as an option in the embodiment of FIG. 2, by bypassing the requirement to detect the multitasking capability of the operating system (MAX1) and instead setting MAX1 to a very high default value.

The above description is included to illustrate the operation of the preferred embodiments, and is not meant to limit the scope of the invention. From the above discussion, many variations will be apparent to one skilled in the art that would yet be encompassed by the spirit and scope of the present invention.

What I claim as my invention is:

1. A method for diagnosing a host computer system, wherein said diagnosing includes virus scanning, said host computer system including at least one processor, an operating system, and one or more memory arrays, comprising the steps of:

(a) determining a maximum number of diagnostic processes that can be simultaneously supported by said operating system, (b) running multiple diagnostic processes, wherein said multiple diagnostic processes include scanning for computer viruses or corrupted data files, and wherein the number of said multiple diagnostic processes is less than or equal to the maximum number of processes determined in step (a).

2. The method of claim 1, wherein said multiple diagnostic processes are executed simultaneously.

3. The method of claim 1, further including:

(c) repeating steps (a) through (b) until a predetermined condition has been satisfied.

4. The method of claim 3, wherein said predetermined condition is that a given amount of data files have been scanned.

5. The method of claim 3, wherein step (c) occurs at predetermined time intervals.

* * * * *